US009876354B2

(12) United States Patent
Compton (10) Patent No.: US 9,876,354 B2
(45) Date of Patent: Jan. 23, 2018

(54) UPS SYSTEMS AND METHODS USING COORDINATED STATIC SWITCH AND INVERTER OPERATION FOR GENERATOR WALK-IN

(71) Applicant: Eaton Corporation, Cleveland, OH (US)

(72) Inventor: Bobby Leonard Compton, Raleigh, NC (US)

(73) Assignee: Eaton Corporation, Cleveland, OH (US)

( * ) Notice: Subject to any disclaimer, the term of this patent is extended or adjusted under 35 U.S.C. 154(b) by 238 days.

(21) Appl. No.: 14/283,744

(22) Filed: May 21, 2014

(65) Prior Publication Data

US 2015/0340864 A1 Nov. 26, 2015

(51) Int. Cl.
*H02J 9/00* (2006.01)
*H02J 3/00* (2006.01)
*H02J 9/06* (2006.01)
*H02M 1/10* (2006.01)

(52) U.S. Cl.
CPC ............. *H02J 3/005* (2013.01); *H02J 9/00* (2013.01); *H02J 9/062* (2013.01); *H02M 1/10* (2013.01); *Y10T 307/625* (2015.04)

(58) Field of Classification Search
CPC .... H02J 3/005; H02J 9/062; H02J 9/00; H02J 9/04; H02M 1/10; Y10T 307/625
USPC .......................................................... 307/66
See application file for complete search history.

(56) References Cited

U.S. PATENT DOCUMENTS

| 5,210,685 | A | * | 5/1993 | Rosa | ........................ | H02J 9/062 307/64 |
|---|---|---|---|---|---|---|
| 6,144,115 | A | | 11/2000 | Massie et al. | | |
| 6,191,500 | B1 | | 2/2001 | Toy | | |
| 6,630,752 | B2 | | 10/2003 | Fleming et al. | | |
| 7,064,458 | B2 | | 6/2006 | Wittner | | |
| 7,129,599 | B2 | | 10/2006 | Divan et al. | | |
| 8,159,086 | B2 | | 4/2012 | Karipides | | |

(Continued)

FOREIGN PATENT DOCUMENTS

| EP | 1 306 958 A2 | 5/2003 |
|---|---|---|
| EP | 1 959 537 A2 | 8/2008 |

OTHER PUBLICATIONS

International Search Report and Written Opinion Corresponding to International Application No. PCT/IB2015/053692; Date of Mailing: Jul. 30, 2015; 8 Pages.

*Primary Examiner* — Rexford Barnie
*Assistant Examiner* — Toan Vu
(74) *Attorney, Agent, or Firm* — Ward and Smith, P.A.

(57) ABSTRACT

An uninterruptible power supply (UPS) system includes an AC output, an inverter coupled to the AC output and configured to provide power at the AC output, and a switch configured to selectively couple a generator (e.g., an engine-generator set) to the AC output. The system further includes a control circuit configured to variably modulate the switch to gradually increase control power flow from the generator to the AC output while causing the inverter to concurrently provide power to the AC output. The switch may be a static switch that includes at least one silicon controlled rectifier (SCR), and the control circuit may be configured to control a conduction interval of the at least one SCR to control power flow from the generator to the AC output.

19 Claims, 9 Drawing Sheets

(56) References Cited

U.S. PATENT DOCUMENTS

| | | | | |
|---|---|---|---|---|
| 2006/0220462 A1* | 10/2006 | O'Leary | ............... | H02J 9/062 307/44 |
| 2008/0116695 A1 | 5/2008 | Peterson | | |
| 2009/0021079 A1* | 1/2009 | Johnson, Jr. | ............ | H02J 9/062 307/68 |
| 2014/0361624 A1* | 12/2014 | Ault | ....................... | H02J 9/062 307/65 |
| 2015/0188362 A1* | 7/2015 | Mondal | ............... | H02M 3/156 307/52 |

\* cited by examiner

UPS SYSTEMS AND METHODS USING COORDINATED STATIC SWITCH AND INVERTER OPERATION FOR GENERATOR WALK-IN

BACKGROUND

The inventive subject matter relates to power conversion apparatus and methods and, more particularly, to uninterruptible power supply (UPS) apparatus and methods.

UPS systems are commonly used in installations such as data centers, medical centers and industrial facilities. UPS systems may be used in such installations, for example, to provide backup power to maintain operation in event of failure of the primary utility supply.

UPS systems may have any of a number of different types of architectures. For example, AC UPS systems may have an on-line or double conversion architecture including a rectifier configured to be coupled to an AC power source and an inverter coupled to the rectifier by a DC bus and configured to provide AC power to a load. A battery or other DC source may be coupled to the DC source, which may provide backup power in the event of failure of the AC source. Standby AC UPS systems may include an inverter that is configured to be coupled to a load by a transfer switch that switches a load between the inverter and an AC source. AC UPS system may have other architectures, such as line interactive and delta conversion architectures.

Large data centers have proliferated with the advent of web services and cloud computing. Some newer large data centers occupy millions of square feet and house hundreds of thousands of servers. Typically powered by the local grid, these centers may include backup power supply systems including UPSs and diesel or gas powered backup engine-generator sets to support continued operation when utility power is lost.

In a double conversion UPS, rectifier and inverter controls may be significantly decoupled because of the presence of energy storage on the DC link between the rectifier and inverter. The rectifier can be used to address source compatibility issues (e.g., voltage droop, harmonics, power factor, distortion, etc.), while the inverter can be used to protect the load (e.g., voltage, distortion, load regulation, etc.).

When an engine-generator set is used in a data center or similar application, the load applied to the engine-generator set is often gradually increased to avoid transient overloading of the engine-generator set and tripping its protection mechanisms. A double conversion UPS can be used to gradually increase loading of an engine-generator set (to "walk in" the engine-generator set) by using the battery and inverter to provide power to the load while the rectifier gradually increases loading of the engine-generator set. Such generator walk-in techniques may be unavailable, however, in UPS systems that do not have a double conversion architecture.

SUMMARY

Some embodiments of the inventive subject matter provide an uninterruptible power supply (UPS) system including an AC output, an inverter coupled to the AC output and configured to provide power at the AC output, and a switch configured to selectively couple a generator (e.g., an engine-generator set) to the AC output. The system further includes a control circuit configured to variably modulate the switch to gradually increase control power flow from the generator to the AC output while causing the inverter to concurrent provide power to the AC output.

In some embodiments, the switch includes a static switch, e.g., a static switch that includes at least one silicon controlled rectifier (SCR). The control circuit may be configured to control a conduction interval of the static switch to control power flow from the generator to the AC output. In some embodiments, the control circuit may be configured to change the conduction interval in discrete steps over respective discrete time intervals to control the power flow from the generator to the AC output. In some embodiments, the control circuit may be configured to vary the conduction interval responsive to a signal indicating a performance margin of the generator.

In some embodiments, the control circuit may be configured to operate the inverter to provide reactive power compensation as power transfer from the generator to the AC output gradually increases. In further embodiments, the control circuit may be configured to operate the inverter to provide harmonic compensation as power transfer from the generator to the AC output gradually increases.

Further embodiments of the inventive subject matter provide a system including a utility power source, an engine-generator set, a static switch configured to couple the engine-generator set to a load, and an inverter having an output configured to be coupled to the load. The system further includes a control circuit operatively coupled to the engine-generator set, the static switch, and the inverter and configured to detect a failure of the utility power source, to activate the engine-generator set and to variably modulate the static switch to gradually increase control power flow from the engine-generator set to the load while causing the inverter to concurrently provide power to the load. The static switch may include at least one SCR and the control circuit may be configured to control a firing angle of the at least one SCR to control power flow from the generator and the load. For example, in some embodiments, the control circuit may be configured to change a conduction interval of the at least one SCR in discrete steps over respective discrete time intervals to control the power flow from the generator to the AC output. In some embodiments, the control circuit may be configured to vary a conduction interval of the SCR responsive to a signal indicating a performance margin of the generator. The control circuit may be further configured to operate the inverter to provide reactive power compensation and/or harmonic compensation.

Methods according to some embodiments of the inventive subject matter include providing AC power to a load from an AC power source. A loss of the AC power source is detected, and the load is responsively transitioned to an inverter of a UPS. A generator is activated responsive to detected loss of the AC power source. A switch configured to couple the generator to the load is variably modulated to gradually increase control power flow from the generator to the load while the inverter concurrently provides power to the load.

The switch may include a static switch including at least one SCR and variably modulating the switch may comprise controlling a conduction interval of the at least one SCR to gradually increase control power flow between the generator and the AC output. Controlling the conduction interval of the at least one SCR may include changing the conduction interval in discrete steps over respective discrete time intervals. In some embodiments, controlling the conduction interval of the at least one SCR may include varying the conduction interval responsive to a signal indicating a performance margin of the generator. The inverter may also be used to provide reactive power compensation and/or harmonic compensation.

DETAILED DESCRIPTION

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Some embodiments of the inventive subject matter arise from a realization that in applications such as data center uninterruptible power supply (UPS) systems, a UPS system having no regulator and inverter DC link to implement conventional generator walk-in, i.e., a "rectifierless" UPS, may operate an inverter and a static switch in a coordinated manner to provide generator walk-in. According to some embodiments, the generator and inverter may be coupled in parallel to the load and generator walk-in may be achieved by using phase control (e.g., firing angle control) of a waveform derived from the generator in conjunction with phase/frequency control of the inverter, e.g., power transfer from the generator is gradually increased as the inverter performs complementary operations to maintain a desired input (voltage and/or current) to the load. As used herein, "gradual" increase in power transfer from a generator to a load refers to a general trend to increase power transfer to the load from the generator. It will be understood that a "gradual" increase in power transfer may include periods in which the power transfer remains constant and/or decreases (e.g., to preserve generator stability as described below) within a general trend of increasing power transfer. In some embodiments, such a gradual increase in power transfer may be achieved by using a conduction interval of the static switch to limit the amount of power drawn from the generator to prevent tripping of protective devices or other events that may accompany an overly large step increase in generator load. Inverter phasing/frequency may be used to maintain the load as the conduction interval is increased. The inverter can also be used for power factor correction and/or harmonic compensation.

Figure 1:
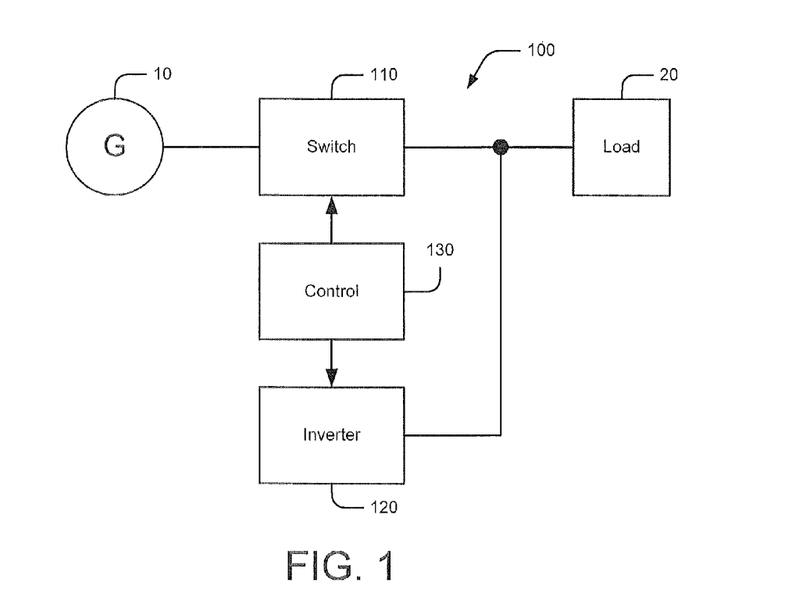
FIG. 1 is a schematic diagram illustrating a UPS system according to some embodiments.

FIG. 1 illustrates a system 100 according to some embodiments of the inventive subject matter. The system 100 includes a switch 110, which is configured to couple and decouple a generator 10 to and from a load 20. The system further includes an inverter 120 having an output coupled to the load 20. A control circuit 130 is configured to variably modulate the switch 110 to gradually increase power transfer from the generator 10 to the load 20 while concurrently causing the inverter 120 to maintain the load by providing additional power. For example, in embodiments described below, a conduction interval of the switch 110 may be incrementally increased to gradually load the generator 10. The inverter 120 may also be operated to control power factor and/or harmonics.

It will be appreciated that the system 100 may be implemented in a number of different ways. For example, the switch 110, the inverter 120, and the control circuit 130 may be incorporated in one or more units (e.g., in a UPS unit) or may be distributed. The switch 110 may be a semiconductor switch, such as a switch utilizing silicon controlled rectifiers (SCRs), insulated gate bipolar transistors (IGBTs), power MOSFETs or other power semiconductor devices. The inverter 120 may employ a half-bridge or other configuration. The control circuit 130 may be implemented using any of a variety of different analog and/or digital circuits, including data processing devices, such as a microcontroller, and may be integrated with the inverter 120 and/or the switch 110 (e.g., in an integrated UPS assembly) or distributed among multiple such components. The generator 10 may be engine-generator set, such as a diesel- or gas-powered engine-generator set.

Figure 2:
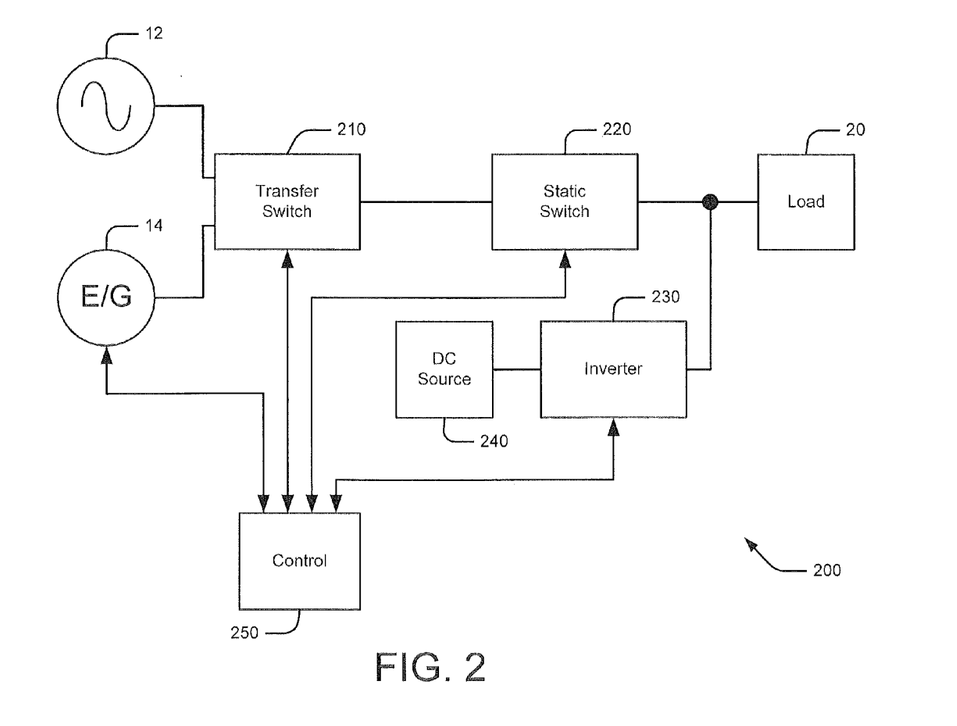
FIG. 2 is a schematic diagram illustrating a UPS system coupled to a utility source and an engine-generator set according to further embodiments.

FIG. 2 illustrates a system 200 according to further embodiments. A utility source 12 and an engine-generator set 14 are coupled to inputs of a transfer switch 210. An output of the transfer switch 210 is coupled to a static switch 220, which has an output coupled to a load 20 in parallel with an inverter 230. The inverter 230 is coupled to a DC power source 240, which may include, for example, a battery and DC/DC converter for interfacing the battery to the inverter 230. A control circuit 250 is operatively coupled to the inverter 230, the static switch 220, the transfer switch 210 and/or the engine-generator set 14 to allow control and/or monitoring thereof.

Figure 3:
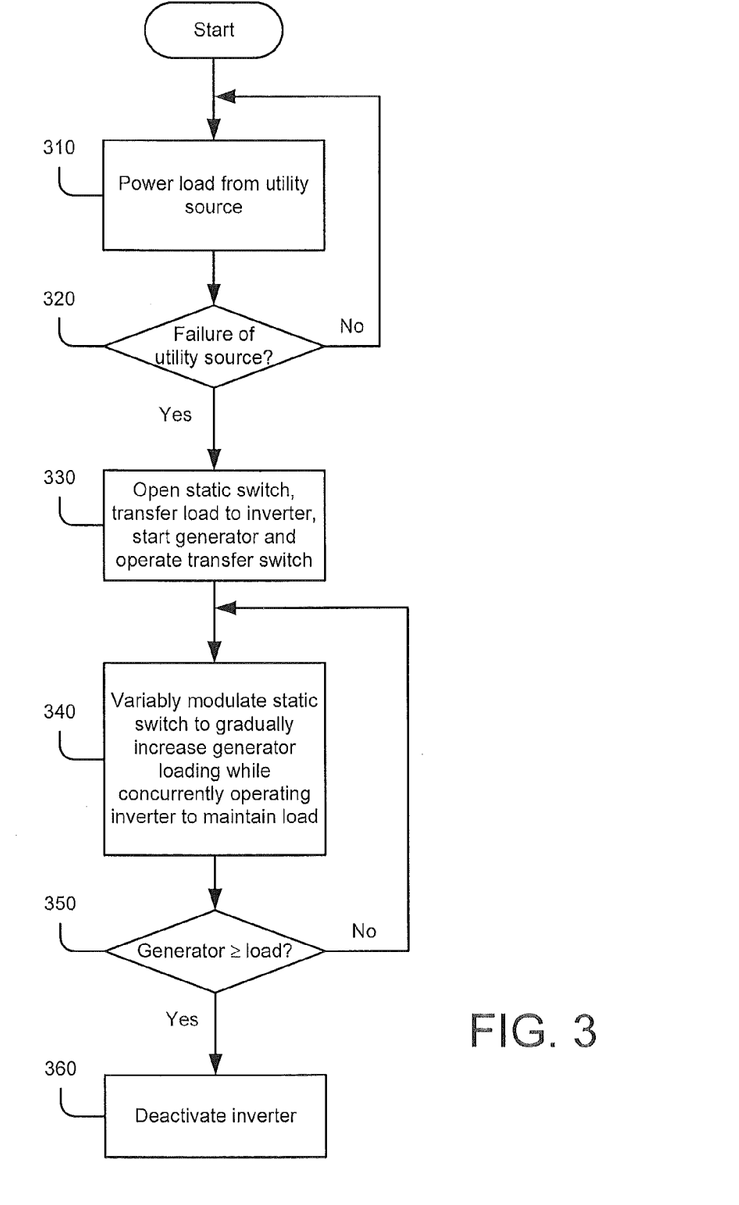
FIG. 3 is a flowchart illustrating operations of a UPS system of FIG. 2 according to further embodiments.

Operations of the system 200 according to some embodiments of the inventive subject matter are illustrated in FIG. 3. The transfer switch 210 is configured to selectively couple the utility source 12 and the engine-generator set 14 to the static switch 220 based on a status of the utility source 12. Under normal conditions, the load 20 is powered from the utility source 12 (block 310). If the utility source 12 fails, the control circuit 250 may cause the static switch 220 to open, cause the inverter 230 to maintain the load 20 using power from the DC power source 240, activate the engine-generator set 14, and cause the transfer switch 210 to couple the engine-generator set 14 to the input of the static switch 220 (blocks 320, 330). Activation of the engine-generator set 14 and operation of the transfer switch 210 may be coordinated in various ways, e.g., the transfer switch may 210 may be transitioned before and/or concurrent with activation of the engine-generator set 14 or may be delayed until the engine-generator set 14 reaches a predetermined operating state after activation. Once the engine-generator set 14 is on line and its output available at the output of the transfer switch 210, the control circuit 250 may then variably modulate the static switch 220 (e.g., by varying a conduction interval thereof) while operating the inverter 230 as described above to gradually walk-in the engine-generator set 14 (block 340). During this process, the inverter 230 may be used to maintain the load and provide reactive power and/or harmonic compensation as described above. Once the engine-generator set 14 is fully able to carry the load 20, the inverter 230 may be deactivated (blocks 350, 360). In some embodiments, however, the inverter 230 may remain active and be used to continue to provide reactive power compensation, harmonic compensation and/or other power conditioning. The inverter 230 may also be operated to facilitate power flow from the engine-generator set 14 to the DC source 240 for battery charging.

Figure 4:
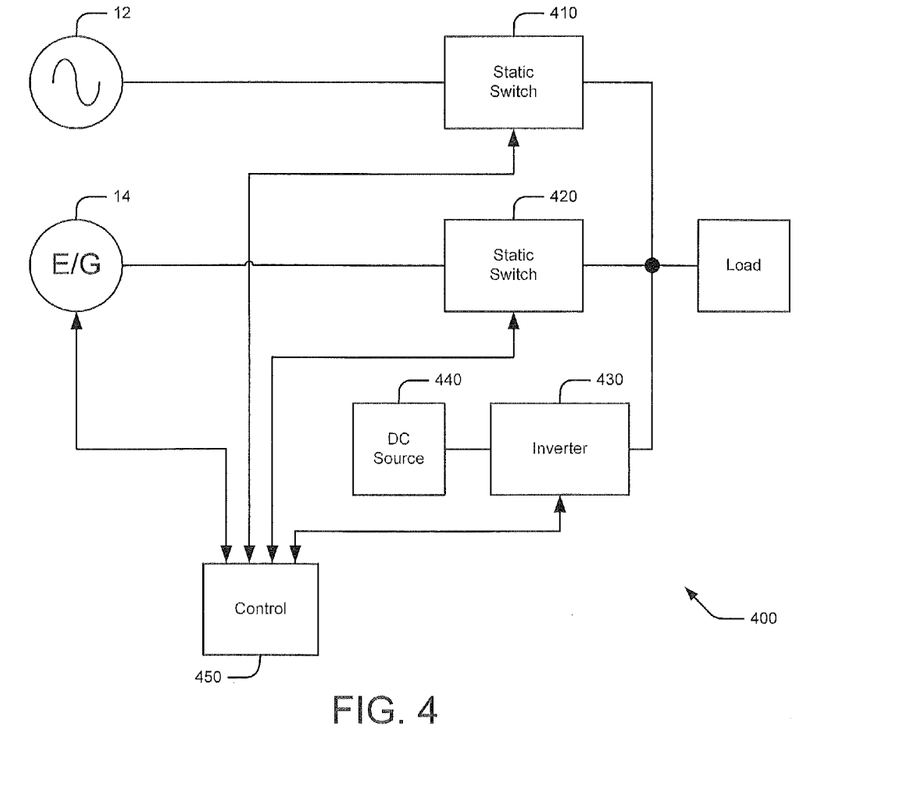
FIG. 4 is a schematic diagram illustrating a UPS system coupled to a utility source and engine-generator set according to further embodiments.

FIG. 4 illustrates a system 400 according to further embodiments with a different configuration from the system 200 of FIG. 2. A utility source 12 and an engine-generator set 14 are coupled to inputs of respective first and second static switches 410, 420 having outputs configured to be coupled in common to a load 20, in parallel with an inverter 430. The inverter 430 is coupled to a DC power source 440 (e.g., a battery and DC/DC converter). A control circuit 450 is operatively coupled to the inverter 430, the first and second static switches 410, 420 and/or the engine-generator set 14 to allow control and/or monitoring thereof.

Figure 5:
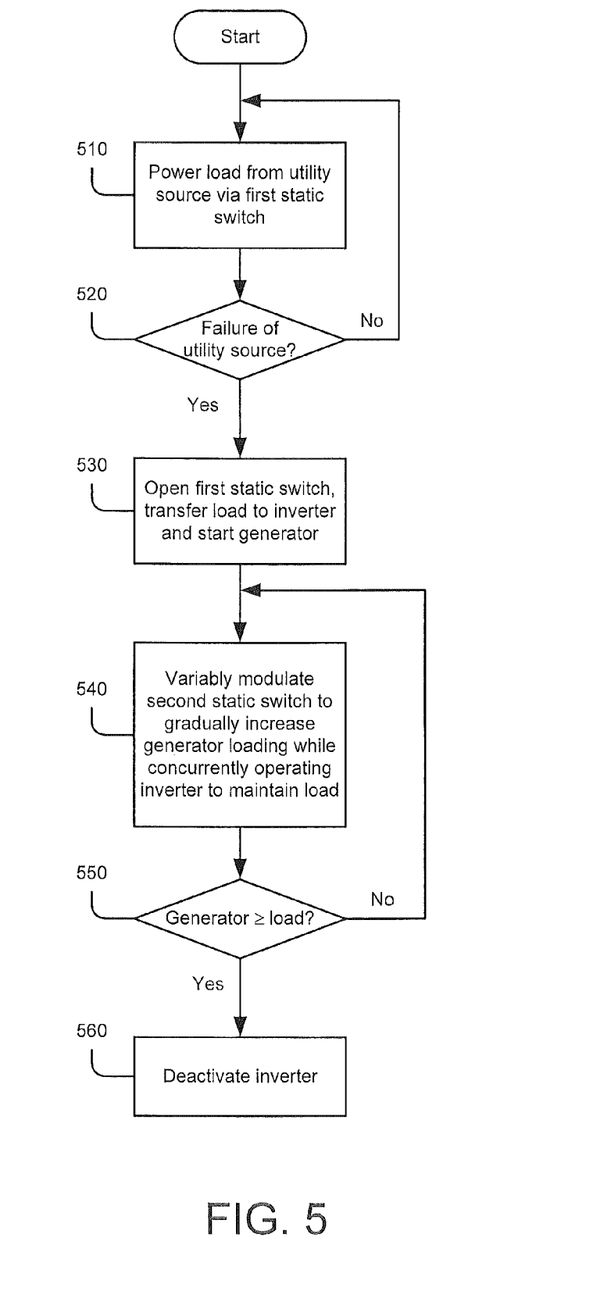
FIG. 5 is a flowchart illustrating operations of a UPS system of FIG. 2 according to further embodiments.

Operations of the system 400 according to some embodiments of the inventive subject matter are illustrated in FIG. 5. Under normal conditions, the load 20 is powered from the utility source 12 (block 510). If the utility source 12 fails, the control circuit 450 may cause the first static switch 410 to open, cause the inverter 430 to maintain the load 20 using power from the DC power source 440, and activate the engine-generator set 14 (blocks 520, 530). Once the engine-generator set 14 is activated, the control circuit 450 may then operate the second static switch 420 and the inverter 430 as described above to gradually walk-in the engine-generator set 14 (block 540). During this process, the inverter 430 may be used to maintain the load and provide reactive power and/or harmonic compensation as described above. Once the engine-generator set 14 is able to carry the load 20, the inverter 430 may be deactivated (blocks 550, 560). In some embodiments, the inverter 430 may remain active and continue to provide reactive power, harmonic compensation and/or other power conditioning while the engine-generator set 14 serves the load. The inverter 430 may also be operated to facilitate power flow from the engine-generator set 14 to the DC source 440 for battery charging.

Figure 6:
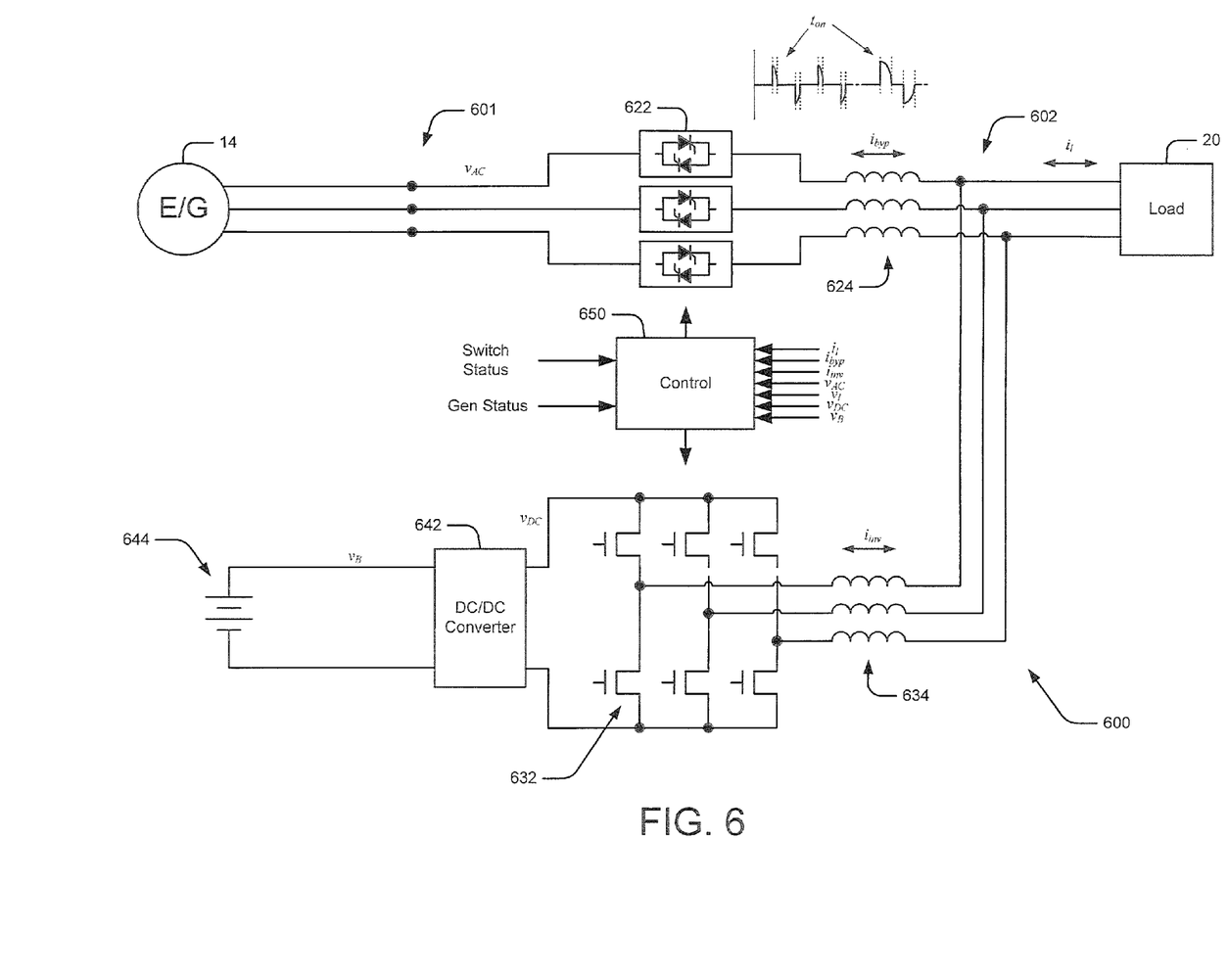
FIG. 6 is a schematic diagram illustrating a three-phase UPS system according to some embodiments.

FIG. 6 illustrates an exemplary implementation of a three-phase UPS system 600 according to some embodiments of the inventive subject matter. The system 600 has an AC input 601 configured to be coupled to an engine-generator set 14 (e.g., directly or via one or more intermediate components, such as a transfer switch) and an AC output configured to be coupled to a load 20. The system 600 includes an inverter circuit 630 including a plurality of half-bridge circuits 632 coupled to a DC/DC converter 642 that generates a DC voltage $v_{DC}$ from a battery voltage $v_B$ generated by a battery 644. Respective inductors 634 couple the half-bridge circuits 632 to the AC output 602. The system 600 further includes a plurality of SCR-based static switches 622 coupled to the AC input 601. Respective inductors 624 couple the static switches 622 to the AC output 602. A control circuit 650 is configured to control the static switches 622 and the half-bridge circuits 632 responsive to various inputs, such as an AC voltage $v_{AC}$ produced by the engine-generator set 14, a DC voltage $v_B$ produced by the battery, a DC voltage $v_{Dc}$ produced by the DC/DC converter, a load current $i_l$, a load voltage $v_l$, a bypass current $i_{byp}$ through the static switches 622, and an inverter current $i_{inv}$ at the output of the inverter 630. The control circuit 650 may also operate response to other information, such as information pertaining to the engine-generator set 14. Such information may include, for example, information relating to the generator's power delivery capability, stability, and the like. The control circuit may also operate responsive to information pertaining to external switches (e.g., transfer switches) that couple the AC input 601 to various power sources.

According to some embodiments, the control circuit 650 may operate the static switches 622 and the half-bridge circuits 632 to walk-in the engine-generator set 14 while maintaining a desired voltage and current at AC output 602. For example, the control circuit 650 may gradually increase a conduction ("on") interval $t_c$ of the static switches 622, while using the inverter 630 to maintain the desired current and voltage at the AC output 602.

Figure 7:
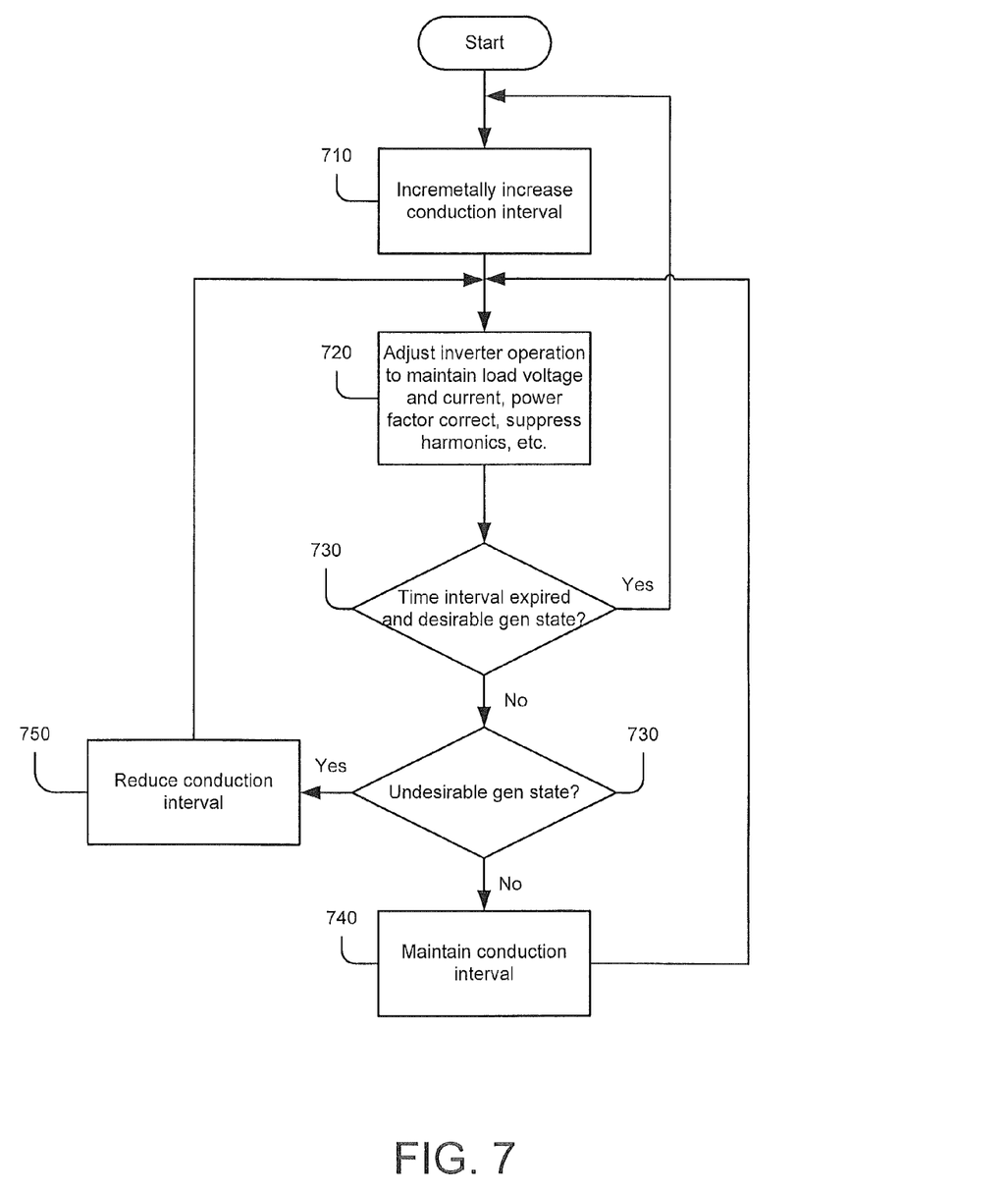
FIGS. 7-10 are flowcharts illustrating exemplary operations of UPS systems according to further embodiments.

The walk-in may occur in any of a number of different ways. For example, as illustrated in FIG. 7, the conduction interval $t_c$ of the SCRs of the static switches 622 may be increased in discrete steps over a series of discrete time intervals by changing the firing angles of the SCRs. The variance of the conduction interval $t_c$ may also be limited subject to indications of desirable generator performance.

Referring to FIG. 7, the conduction interval $t_c$ of the static switches 622 may be incrementally increased (block 710) by incrementally changing the firing angles of SCRs of the static switches 622, and the inverter 630 responsively adjusted to maintained the load (block 720). After a predetermined time interval has elapsed without indication of an undesirable generator state, the conduction interval $t_c$ may again be incrementally increased (blocks 730, 710). An undesirable generator state may be indicated by, for example, waveform degradation and/or signaling from the control system of the engine-generator set 14 (e.g., the engine-generator set 14 may generate a signal in response to an unacceptably high error in its speed control). If an undesirable generator state is detected, the static switch conduction interval $t_c$ may be reduced (blocks 730, 750). If the predetermined time interval has not yet elapsed and the generator state is acceptable, the static switch conduction interval $t_c$ may be maintained until the predetermined time interval has elapsed (blocks 730, 740).

The static switch conduction interval $t_c$ may also be controlled responsive to measure of a performance margin of the engine-generator set 14. For example, a control circuit of the engine-generator set 14 may be configured to signal a degree of available performance margin, e.g., a signal derived from an error signal of a speed control loop of the engine-generator set 14, and the control circuit 650 may control the static switch conduction interval $t_c$ responsive to this measure. This may allow for faster walk-in of the engine-generator set 14 in comparison to the process illustrated in FIG. 7.

Figure 8:
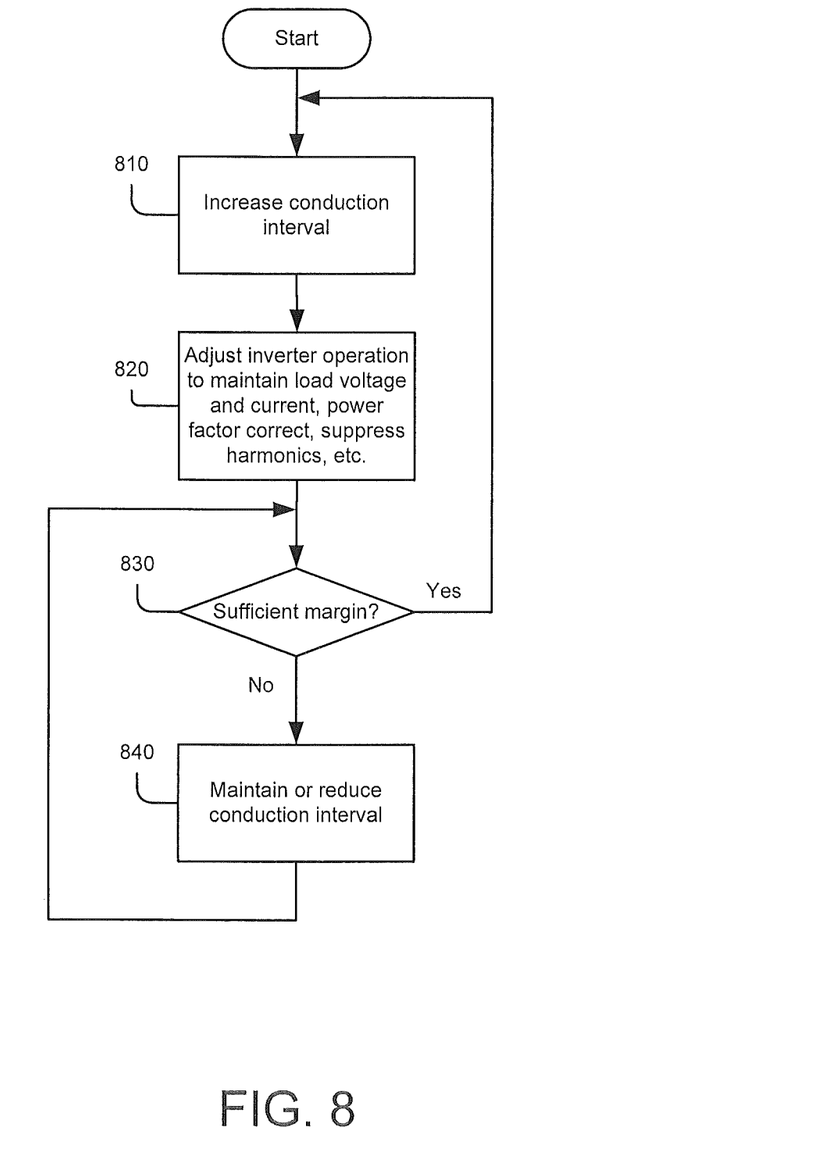

Referring to FIG. 8, the static switch conduction interval is increased concurrent with adjusting inverter operation to maintain the load (blocks 810, 820). As long as sufficient margin for generator operation is indicated, the conduction interval is increased and inverter responsively adjusted (blocks 830, 810). If an insufficient generator margin is indicated, however, the conduction interval may be maintained or reduced as indicated by the generator margin (blocks 830, 840). It will be appreciated that the static switch conduction interval and the inverter operation may be continuously adjusted using, for example, proportional feedback control loops.

According to various embodiments, a static switch and inverter may be used in a number of different ways to provide walk-in as described above. For example, in some embodiments, a UPS system may alternate a load between the generator and the inverter during non-overlapping time intervals. In further embodiments, the inverter may remain active while the generator is coupled to the load, but may be used in a mode in which it acts as a current source to provide real and reactive power and/or compensate for harmonics.

Figure 9:
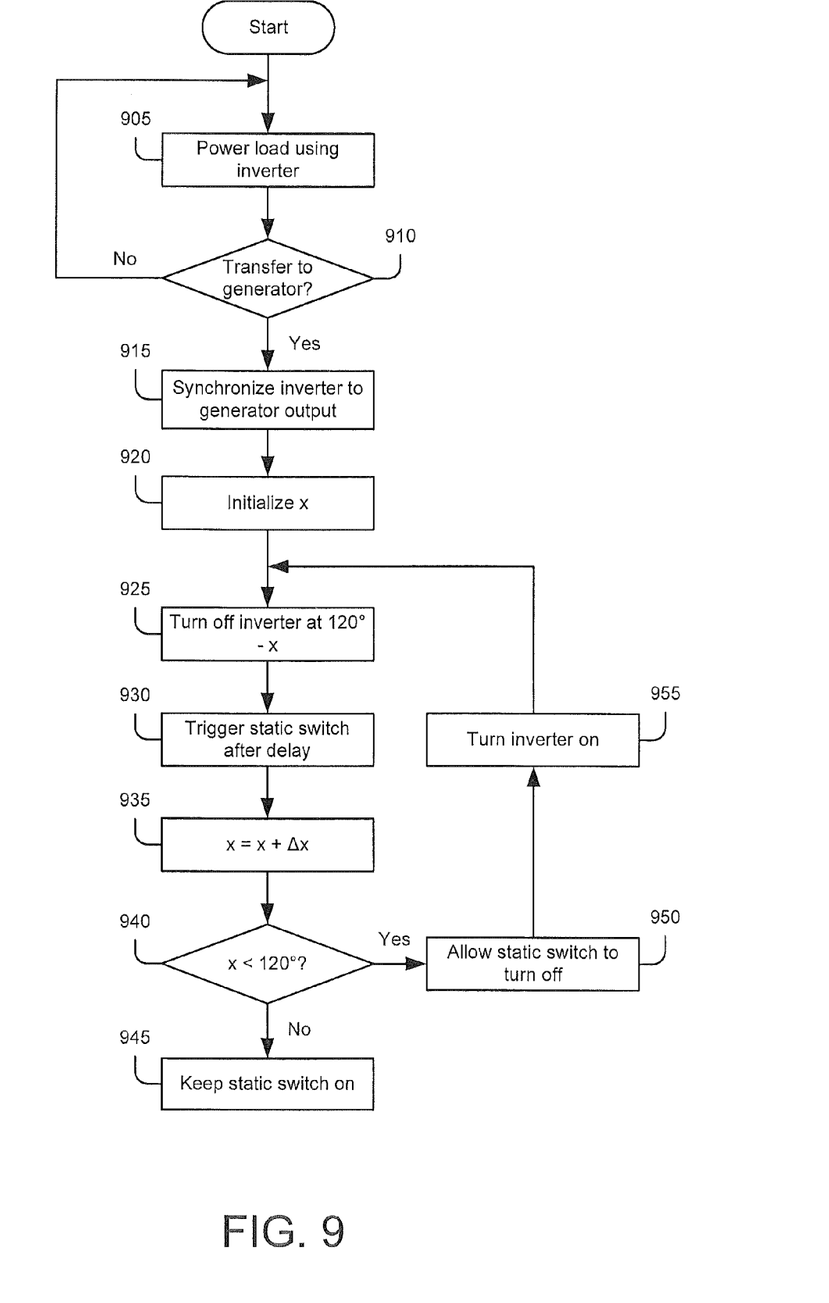

Referring to FIG. 9, in response the loss of a primary (e.g., utility) source, the inverter is used to provide power to the load (block 905). When the system determines that transfer to a generator is appropriate (e.g., after the generator has been started and brought up to a nominal operating condition), the inverter is synchronized to the generator's output and a value x, corresponding to an amount of a third of a cycle (for a three-phase system) of the generator AC waveform for which the load is to be coupled to the generator by a static switch, is initialized (blocks 910, 915, 920). The inverter is turned off at point during the generator voltage waveform corresponding to a third of a cycle minus the value x (block 925). The inverter may, for example, be placed in a standby mode in which its power switching devices are disabled (e.g., placed in a high impedance state), while the inverter's control circuitry remains active and continues to be synchronized to the generator waveform. After a delay suitable to ensure the inverter has commutated off, the static switch is triggered to couple the generator to the load (block 930). The value x is incremented and, if still less than a third of a cycle of the generator waveform, the static switch is turned off (e.g., allowed to commutate off at the next zero crossing of the generator voltage) (blocks 935, 950). The inverter is then turned on at the state of a new third of a cycle and provides power to the load for a reduced period of time (blocks 955, 925). If the value x equals or exceeds the length of a third of a cycle, the static switch is kept on to allow the generator to continue to power the load (blocks 940, 945). The inverter may remain deactivated at this point or may be selectively used for power conditioning (e.g., harmonic suppression) or other purposes. The amount Δx by which the value x is incremented may be a fixed or otherwise predetermined value and/or may be a value that is adjusted based on monitored system parameters (e.g., voltage, frequency, generator speed loop error, etc.).

Figure 10:
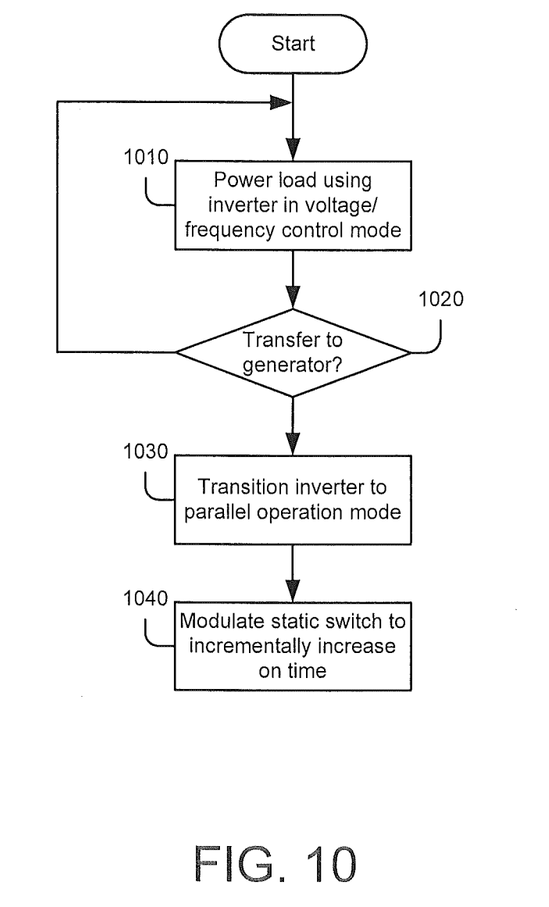

In further embodiments, when walk-in of the generator commences, an inverter may be switched from a mode in which it solely controls the voltage/frequency at the load to a parallel operation mode. Referring to FIG. 10, in response the loss of a primary (e.g., utility) source, the inverter is used to provide power to the load (block 1010). When the system determines that transfer to a generator is appropriate (e.g., after the generator has been started and brought up to a nominal operating condition), the inverter is transitioned to a paralleled operation mode in which the inverter may provide real or reactive power to the load to reduce loading of the generator and/or to provide harmonic compensation to produce a desirable waveform at the load, e.g., limit frequency deviation and/or voltage droop (blocks 1020, 1030). While the inverter is operating in this mode, the static switch is modulated to gradually increase the "on" time in which the generator is coupled to the load. The on time of the static switch may be increased in a predetermined manner and/or may be adjusted based on monitored system parameters.

It will be appreciated that the system and operations illustrated in FIGS. 6-10 are provided for purposes of illustration, and that embodiments of the inventive subject matter are not limited thereto. For example, although the system of FIG. 6 uses an SCR-based static switch, other types of switches may be used and controlled in the same or different manner. For example, a transistor-based switch may be controlled using pulse-width modulation or other techniques, rather than the firing angle control of waveform-commutated SCRs described above. Such transistor-based switching devices may also be used for power factor control and other functions. It will be further appreciated that the inventive subject matter may be power distribution system such as the configurations shown in FIGS. 2 and 4, as well in other power distribution system arrangements.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. An uninterruptible power supply (UPS) comprising:
   an AC output;
   an inverter coupled to the AC output and configured to provide power at the AC output;
   a switch configured to selectively couple a generator to the AC output; and
   a control circuit configured to alternately turn on the switch and activate the inverter in respective separate intervels to gradually increase power flow from the generator to the AC output.

2. The UPS of claim 1, wherein the switch comprises a static switch.

3. The UPS of claim 1, wherein the control circuit is configured to change the conduction interval durations in discrete steps over respective discrete time intervals to control the power flow from the generator to the AC output.

4. The UPS of claim 1, wherein the control circuit is configured to vary the conduction interval durations responsive to a signal indicating a performance margin of the generator.

5. The UPS of claim 1, wherein the control circuit is configured to operate the inverter to provide reactive power compensation.

6. The UPS of claim 1, wherein the control circuit is configured to operate the inverter to provide harmonic compensation.

7. A system comprising:
a utility power source;
an engine-generator set;
a static switch configured to couple the engine-generator set to a load;
an inverter having an output configured to be coupled to the load; and
a control circuit operatively coupled to the engine-generator set, the static switch, and the inverter and configured to detect a failure of the utility power source, to activate the engine-generator set and to alternately turn on the switch and activate the inverter in respective separate intervals to gradually increase power flow from the engine-generator set to the load.

8. The system of claim 7, wherein the static switch comprises at least one SCR and wherein the control circuit is configured to intermittently turn on the at least one SCR in spaced apart conduction intervals and to control durations of the conduction intervals of the at least one SCR to gradually increase power flow from the engine-generator set to the load.

9. The system of claim 8, wherein the control circuit is configured to change the conduction interval durations of the at least one SCR in discrete steps over respective discrete time intervals to control the power flow from the generator to the load.

10. The system of claim 8, wherein the control circuit is configured to vary the conduction interval durations of the at least one SCR responsive to a signal indicating a performance margin of the generator.

11. The system of claim 8, wherein the control circuit is configured to operate the inverter to provide reactive power compensation and/or harmonic compensation.

12. A method comprising:
providing AC power to a load from an AC power source;
detecting a loss of the AC power source;
transitioning the load to an inverter of a UPS responsive to the detected loss of the AC power source;
activating a generator responsive to detected loss of the AC power source; and
alternately coupling the generator to the load via a switch and activating the inverter in respective separate intervals.

13. The method of claim 12, wherein the switch comprises a static switch comprising at least one SCR and wherein alternately coupling the generator to the load via a switch and activating the inverter in respective separate intervals comprises intermittently turning on the at least one SCR in spaced apart conduction intervals and controlling durations of the conduction intervals of the at least one SCR to gradually increase power flow between the generator and the load.

14. The method of claim 13, wherein controlling durations of the conduction intervals of the at least one SCR to gradually increase power flow between the generator and the load comprises changing the conduction interval durations of the at least one SCR in discrete steps over respective discrete time intervals to control the power flow from the generator to the load.

15. The method of claim 13, wherein controlling durations of the conduction intervals of the at least one SCR to gradually increase power flow between the generator and the load comprises varying the conduction interval durations of the at least one SCR responsive to a signal indicating a performance margin of the generator.

16. The method of claim 12, further comprising operating the inverter to provide reactive power compensation and/or harmonic compensation.

17. The UPS of claim 1, wherein the inverter is constrained to be inactive during the intervals in which the switch is on.

18. The system of claim 7, wherein the inverter is constrained to be inactive during the intervals in which the static switch is on.

19. The method of claim 12, wherein the inverter is constrained to be inactive during the intervals in which the switch is on.

* * * * *

UNITED STATES PATENT AND TRADEMARK OFFICE
CERTIFICATE OF CORRECTION

PATENT NO. : 9,876,354 B2
APPLICATION NO. : 14/283744
DATED : January 23, 2018
INVENTOR(S) : Bobby Leonard Compton It is certified that error appears in the above-identified patent and that said Letters Patent is hereby corrected as shown below:

On the Title Page

Under abstract "19 Claims, 9 Drawing Sheets" should read --20 Claims, 9 Drawing Sheets--.

In the Claims

Column 8, Line 45-Column 10, Line 39, (approx.):
The order of the claims is incorrect. The correct order is as follows and includes corrected claim dependencies:
1. An uninterruptible power supply (UPS) comprising:
an AC output;
an inverter coupled to the AC output and configured to provide power at the AC output;
a switch configured to selectively couple a generator to the AC output; and
a control circuit configured to alternately turn on the switch and activate the inverter in respective separate intervals to gradually increase power flow from the generator to the AC output.

2. The UPS of claim 1, wherein the switch comprises a static switch.

3. The UPS of claim 2, wherein the control circuit is configured to intermittently turn on the static switch in spaced apart conduction intervals and to control durations of the conduction intervals of the static switch to gradually increase power flow from the generator to the AC output.

4. The UPS of claim 3, wherein the control circuit is configured to change the conduction interval durations in discrete steps over respective discrete time intervals to control the power flow from the generator to the AC output.

5. The UPS of claim 3, wherein the control circuit is configured to vary the conduction interval durations responsive to a signal indicating a performance margin of the generator.

Signed and Sealed this
Sixteenth Day of April, 2019

Andrei Iancu
*Director of the United States Patent and Trademark Office*

6. The UPS of claim 1, wherein the control circuit is configured to operate the inverter to provide reactive power compensation.

7. The UPS of claim 1, wherein the control circuit is configured to operate the inverter to provide harmonic compensation.

8. The UPS of claim 1, wherein the inverter is constrained to be inactive during the intervals in which the switch is on.

9. A system comprising:
a utility power source;
an engine-generator set;
a static switch configured to couple the engine-generator set to a load;
an inverter having an output configured to be coupled to the load; and
a control circuit operatively coupled to the engine-generator set, the static switch, and the inverter and configured to detect a failure of the utility power source, to activate the engine-generator set and to alternately turn on the switch and activate the inverter in respective separate intervals to gradually increase power flow from the engine-generator set to the load.

10. The system of claim 9, wherein the static switch comprises at least one SCR and wherein the control circuit is configured to intermittently turn on the at least one SCR in spaced apart conduction intervals and to control durations of the conduction intervals of the at least one SCR to gradually increase power flow from the engine-generator set to the load.

11. The system of claim 9, wherein the control circuit is configured to change the conduction interval durations of the at least one SCR in discrete steps over respective discrete time intervals to control the power flow from the generator to the load.

12. The system of claim 10, wherein the control circuit is configured to vary the conduction interval durations of the at least one SCR responsive to a signal indicating a performance margin of the generator.

13. The system of claim 10, wherein the control circuit is configured to operate the inverter to provide reactive power compensation and/or harmonic compensation.

14. The system of claim 9, wherein the inverter is constrained to be inactive during the intervals in which the static switch is on.

15. A method comprising:
providing AC power to a load from an AC power source;
detecting a loss of the AC power source;
transitioning the load to an inverter of a UPS responsive to the detected loss of the AC power source;
activating a generator responsive to detected loss of the AC power source; and
alternately coupling the generator to the load via a switch and activating the inverter in respective separate intervals to gradually increase power flow from the generator to the load.

16. The method of claim 15, wherein the switch comprises a static switch comprising at least one SCR and wherein alternately coupling the generator to the load via a switch and activating the inverter in respective separate intervals comprises intermittently turning on the at least one SCR in spaced apart conduction intervals and controlling durations of the conduction intervals of the at least one SCR to gradually increase power flow between the generator and the load.

17. The method of claim 16, wherein controlling durations of the conduction intervals of the at least one SCR to gradually increase power flow between the generator and the load comprises changing the conduction interval durations of the at least one SCR in discrete steps over respective discrete time intervals to control the power flow from the generator to the load.

18. The method of claim 16, wherein controlling durations of the conduction intervals of the at least one SCR to gradually increase power flow between the generator and the load comprises varying the conduction interval durations of the at least one SCR responsive to a signal indicating a performance margin of the generator to gradually increase power flow from the generator to the load.

19. The method of claim 15, further comprising operating the inverter to provide reactive power compensation and/or harmonic compensation.

20. The method of claim 15, wherein the inverter is constrained to be inactive during the intervals in which the switch is on.